(12) United States Patent
Seetharam et al.

(10) Patent No.: US 12,156,519 B2
(45) Date of Patent: Dec. 3, 2024

(54) ARTHROPOD LURE OR REPELLENT, ARTHROPOD TRAP, AND LIGHTING DEVICE

(71) Applicant: PESTRONIKS INNOVATIONS PTE LTD, Singapore (SG)

(72) Inventors: Shankar Seetharam, Singapore (SG); Carl Baptista, Singapore (SG)

(73) Assignee: PESTRONIKS INNOVATIONS PTE LTD, Singapore (SG)

( * ) Notice: Subject to any disclaimer, the term of this patent is extended or adjusted under 35 U.S.C. 154(b) by 0 days.

(21) Appl. No.: 17/638,381

(22) PCT Filed: Apr. 21, 2020

(86) PCT No.: PCT/SG2020/050246
§ 371 (c)(1),
(2) Date: Feb. 25, 2022

(87) PCT Pub. No.: WO2021/040613
PCT Pub. Date: Mar. 4, 2021

(65) Prior Publication Data
US 2022/0295774 A1    Sep. 22, 2022

(30) Foreign Application Priority Data

Aug. 26, 2019 (SG) ............................ 10201907876U
Aug. 26, 2019 (SG) ............................ 10201907879X
Aug. 26, 2019 (SG) ............................ 10201907881R

(51) Int. Cl.
*A01M 1/04* (2006.01)
*A01G 7/04* (2006.01)
*A01M 29/10* (2011.01)

(52) U.S. Cl.
CPC ............... *A01M 1/04* (2013.01); *A01G 7/045* (2013.01); *A01M 29/10* (2013.01)

(58) Field of Classification Search
USPC .................................................. 43/113, 114
See application file for complete search history.

(56) References Cited

U.S. PATENT DOCUMENTS 5,231,790 A * 8/1993 Dryden ................. A01M 1/145
                                                         43/113
5,353,542 A * 10/1994 Vaudry ................. A01M 1/145
                                                         43/107
(Continued)

FOREIGN PATENT DOCUMENTS

CN     103162132 A      6/2013
CN     103392681 A     11/2013
(Continued)

OTHER PUBLICATIONS

Merged translation of KR 20160127975 A (Year: 2016).*
(Continued)

*Primary Examiner* — Morgan T Jordan
(74) *Attorney, Agent, or Firm* — NIXON PEABODY LLP

(57) ABSTRACT

Arthropod lure or repellent (10), an arthropod trap (60) and a lighting device (140). The arthropod lure or repellent (10) includes a substrate (12), a fluorescent material (14) comprising different fluorophores is attached to the substrate (12), and an ultraviolet light source (16) comprising a plurality of light emitting diodes (LEDs) to emit different wavelengths of light are arranged to illuminate the fluorescent material (14). The fluorescent material (14) is arranged to absorb the light from the plurality of LEDs and perform a Stokes shift to create re-emitted light, wherein the re-emitted light is centered at a wavelength (20) longer than the wavelength of the ultraviolet light source (16) illuminating the florescent material (14).

28 Claims, 15 Drawing Sheets

(56) References Cited

U.S. PATENT DOCUMENTS

| | | | |
|---|---|---|---|
| 5,513,465 A * | 5/1996 | Demarest | A01M 1/145 43/113 |
| 5,866,076 A | 2/1999 | Fencl et al. | |
| 5,915,948 A * | 6/1999 | Kunze | A01M 1/145 43/113 |
| 5,958,336 A | 9/1999 | Duarte | |
| 6,199,316 B1 | 3/2001 | Coventry | |
| 6,497,840 B1 | 12/2002 | Palestro et al. | |
| 6,504,179 B1 | 1/2003 | Ellens et al. | |
| 6,543,210 B2 | 4/2003 | Rostoucher et al. | |
| 6,589,323 B1 | 7/2003 | Korin | |
| 6,635,987 B1 | 10/2003 | Wojnarowski et al. | |
| 6,662,489 B2 | 12/2003 | Spiro et al. | |
| 6,840,003 B2 | 1/2005 | Moore | |
| 6,965,205 B2 | 11/2005 | Piepgras et al. | |
| 7,018,081 B2 | 3/2006 | Hopkins | |
| 7,073,287 B2 | 7/2006 | Lau | |
| 7,181,885 B2 | 2/2007 | Spiro et al. | |
| 7,191,560 B2 | 3/2007 | Harris | |
| 7,281,350 B2 | 10/2007 | Wilbanks | |
| 7,784,215 B2 | 8/2010 | Cohnstaedt et al. | |
| 2003/0052599 A1 | 3/2003 | Sun | |
| 2003/0217641 A1 | 11/2003 | Palestro et al. | |
| 2004/0160199 A1* | 8/2004 | Morgan | G09G 3/14 315/312 |
| 2004/0252499 A1 | 12/2004 | Tumlinson et al. | |
| 2006/0067073 A1 | 3/2006 | Ting | |
| 2006/0080888 A1* | 4/2006 | Greening | A01M 1/145 43/113 |
| 2006/0150472 A1* | 7/2006 | Harris | A01M 1/04 43/113 |
| 2007/0235751 A1 | 10/2007 | Radkov et al. | |
| 2008/0048193 A1 | 2/2008 | Yoo et al. | |
| 2009/0288333 A1* | 11/2009 | Johnston | A01M 1/02 43/107 |
| 2011/0296740 A1 | 12/2011 | Yamada et al. | |
| 2012/0176765 A1* | 7/2012 | Uchida | A01M 1/04 362/2 |
| 2012/0297662 A1* | 11/2012 | Strube | A01M 1/145 43/113 |
| 2013/0169146 A1 | 7/2013 | Aoki et al. | |
| 2016/0342103 A1 | 11/2016 | Ron et al. | |
| 2017/0290322 A1 | 10/2017 | Soeno | |
| 2017/0295772 A1* | 10/2017 | Studer | A01M 1/145 |
| 2018/0000060 A1* | 1/2018 | Meneley | A01M 1/023 |
| 2018/0184635 A1* | 7/2018 | Studer | A01M 1/04 |
| 2020/0221685 A1* | 7/2020 | Seetharam | F21S 4/26 |
| 2020/0260713 A1* | 8/2020 | Parnell | A01M 1/145 |
| 2020/0344992 A1* | 11/2020 | Kaye | H05B 47/10 |
| 2020/0375168 A1* | 12/2020 | Kaye | A01M 1/026 |
| 2022/0039366 A1* | 2/2022 | Parnell | A01M 1/145 |
| 2022/0338459 A1* | 10/2022 | Kaye | A01M 1/026 |

FOREIGN PATENT DOCUMENTS

| | | | |
|---|---|---|---|
| CN | 105246326 A | | 1/2016 |
| CN | 107613765 A | | 1/2018 |
| EP | 1738645 A1 | | 1/2007 |
| JP | 2002133910 A | | 5/2002 |
| JP | 2002369647 A | | 12/2002 |
| JP | 200370402 A | | 3/2003 |
| JP | 2003073212 A | | 3/2003 |
| JP | 2003199471 A | | 7/2003 |
| JP | 2008071806 A | | 3/2008 |
| JP | 2011108424 A | | 6/2011 |
| JP | 2013247942 A | | 12/2013 |
| JP | 5535196 B2 | | 7/2014 |
| JP | 2015-171440 A | | 10/2015 |
| JP | 6272927 A | | 1/2018 |
| JP | 2018-83153 A | | 5/2018 |
| KR | 20160127975 A | * | 11/2016 |
| KR | 20170073555 A | * | 6/2017 |
| WO | WO 2005053389 A1 | * | 6/2005 |
| WO | WO 2010098377 A1 | * | 9/2010 |
| WO | 2014/150519 A1 | | 9/2014 |
| WO | WO 2018182265 A1 | * | 10/2018 |

OTHER PUBLICATIONS

Merged translation of KR 20170073555 A (Year: 2017).*
Merged translation of WO 2005053389 A1 (Year: 2005).*
Merged translation of WO 2010098377 A1 (Year: 2010).*
Merged translation of WO 2018182265 A1 (Year: 2018).*
Chinese Office Action for Application No. 202080060695.6, mailed May 20, 2023 (12 pages).
Australian Examination Report No. 1 for Application No. 2020337752, mailed May 26, 2023 (4 pages).
International Search Report for Application No. PCT/SG2020/050246, mailed Aug. 4, 2020.
Written Opinion for Application No. PCT/SG2020/050246, mailed Aug. 4, 2020.
India Office Action for Application No. 202217015902, mailed Sep. 1, 2022, (5 pages).
Chinese Office Action for Application No. 202080060695.6, mailed Nov. 10, 2022, (14 pages).
Extended European Search Report for Application No. 20855861.9, mailed Aug. 21, 2023 (10 pages).
Japanese Office Action in Application No. 202-513615 mailed Dec. 11, 2023 (17 pp. includes English translation).
Chinese Office Action for Application No. 202080060695.6, mailed Oct. 12, 2023 (26 pages).
Yu Anqi, "A practical guide to LED illumination detection, 1st Edition", Anhui Science and Technology Press, Jun. 30, 2019; (pp. 69-70) 10 pp. with machine-translation retrieved on-line Oct. 11, 2023.

* cited by examiner

ARTHROPOD LURE OR REPELLENT,
ARTHROPOD TRAP, AND LIGHTING
DEVICE

FIELD OF THE INVENTION

The present invention relates, in general, to arthropod management and, more particularly, to an arthropod lure or repellent, an arthropod trap and a lighting device.

BACKGROUND OF THE INVENTION

Certain arthropods such as, for example, mosquitoes and flies are a bane to mankind. Apart from causing annoyance, these arthropods are also known to spread diseases. It would therefore be desirable to provide an arthropod lure or repellent, an arthropod trap and a lighting device to manage their numbers.

SUMMARY OF THE INVENTION

Accordingly, in a first aspect, the present invention provides an arthropod lure or repellent. The arthropod lure or repellent includes a substrate, a fluorescent material attached to the substrate, and an ultraviolet light source arranged to illuminate the fluorescent material with light of a first wavelength. The fluorescent material is arranged to absorb the light of the first wavelength and re-emit the light at a second wavelength, the second wavelength being longer than the first wavelength.

In a second aspect, the present invention provides an arthropod trap. The arthropod trap includes a substrate, a fluorescent material attached to the substrate, and an arthropod immobilizer arranged to immobilize one or more arthropods attracted by the fluorescent material. The fluorescent material is arranged to absorb light of a first wavelength and re-emit the light at a second wavelength, the second wavelength being longer than the first wavelength.

In a third aspect, the present invention provides a lighting device. The lighting device includes a housing, an ultraviolet light source received in the housing, and a fluorescent material on a surface of the housing. The fluorescent material is arranged to absorb light of a first wavelength from the ultraviolet light source and re-emit the light at a second wavelength, the second wavelength being longer than the first wavelength.

Other aspects and advantages of the invention will become apparent from the following detailed description, taken in conjunction with the accompanying drawings, illustrating by way of example the principles of the invention.

BRIEF DESCRIPTION OF THE DRAWINGS

Embodiments of the invention will now be described, by way of example only, with reference to the accompanying drawings, in which.

DETAILED DESCRIPTION OF EXEMPLARY EMBODIMENTS

Figure 1:
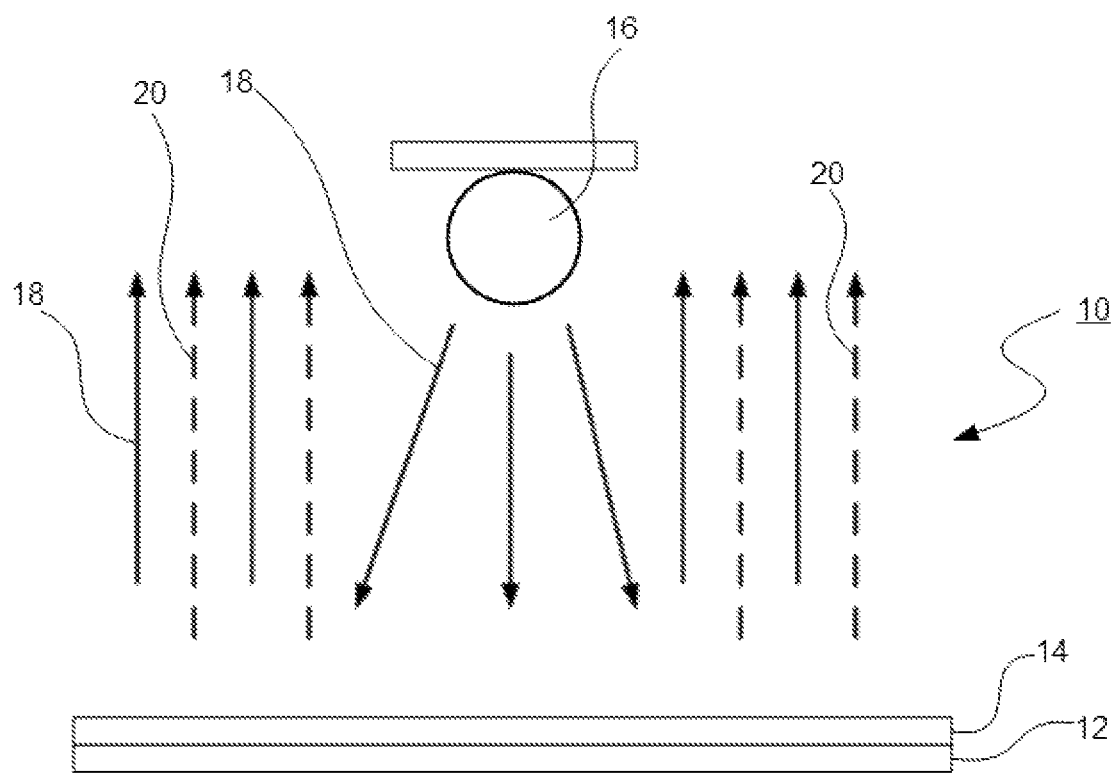
FIG. 1 is a schematic cross-sectional view of an arthropod lure or repellent in accordance with an embodiment of the present invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the scope of the invention. In the drawings, like references indicate similar elements.

Referring now to FIG. 1, an arthropod lure or repellent 10 in accordance with one embodiment is shown. The arthropod lure or repellent 10 includes a substrate 12, a fluorescent material 14 attached to the substrate 12, and an ultraviolet light source 16 arranged to illuminate the fluorescent material 14 with light of a first wavelength 18. The fluorescent material 14 is arranged to absorb the light of the first wavelength 18 and re-emit the light at a second wavelength 20, the second wavelength 20 being longer than the first wavelength 18.

Visual capabilities in arthropods are determined by two (2) distinct organs: ocelli and compound eyes.

The ocelli detect the intensity of light and connect directly to the ganglion of the arthropod initiating rapid stimulation of other body parts to initiate motion. The ocelli are primarily organs that control any phototaxis response in arthropods.

The compound eyes allow an arthropod to differentiate colors and are also involved in processing of navigational movement and detection of prey or predators. The compound eyes are made up of basal units known as ommatidia. Different arthropods have different numbers and arrangements of ommatidia. Each ommatidium contains a lens at the surface and eight (8) photoreceptor neurons (R1-R8) directly beneath that are arranged in a trapezoid/hexagonal manner giving arthropod compound eyes a distinct honeycomb appearance. Each ommatidium is composed of several photopigments that absorb specific wavelengths of light. The photopigments are known as Rhodopsins (Rh) and absorb specific wavelengths of light within each photoreceptor in the ommatidium. As an example, Rh1 absorbs light at wavelengths of 490 nanometres (nm) and 360 nm, Rh4 absorbs light at a wavelength of 375 nm and Rh3 absorbs light at a wavelength of 345 nm. When a photon of specific wavelengths of light enters the ommatidium, an intracellular reaction occurs generating an electrical signal to the nervous system of the arthropod in a process known as phototransduction. The phototransduction process is a biochemical reaction that is dependent on the wavelength of the photon of light. Depending on the Rhodopsin pigments present and the lens present in the arthropod, each ommatidium can vary the levels of phototransduction depending on the wavelength of light received.

The arthropod lure or repellent 10 exploits the spectral sensitivity of arthropods to generate either a positive phototaxis response to attract the arthropods or a negative phototaxis response to repel the arthropods. The arthropod lure or repellent 10 may be disposed in an arthropod trap.

The substrate 12 may be made of any solid material such as, for example, paper, cardboard, wood, cork, plastic (e.g., polyester, polyurethane, polyamide, polycarbonate, polyolefin, etc.), woven or nonwoven fabric (e.g., cotton, polyester, polyolefin, nylon, etc.), metal (e.g., aluminum, iron, etc.), glass, fused silica and ceramic. The substrate 12 may also be provided in a variety of colours such as, for example, yellow, black, white and/or grey to attract targeted arthropods. In alternative embodiments, one or more surfaces of the substrate 12 may be provided with colours that repel arthropods, allowing users to reduce a quantity of arthropods in any given location.

The fluorescent material 14 performs a Stokes shift on the light emitted by the ultraviolet light source 16 by absorbing photons of the light, gaining energy and entering an exited state before re-emitting alternative photons of the light to lose and release the gained energy. The Stokes shift effect may be measured as the difference between maximum wavelengths in excitation and emission spectra of the fluorescent material 14. The size of the shift may vary with molecular structure of the fluorescent material 14 and may range from a few nanometers to over several hundred nanometers. The "Stokes shift" for each excited wavelength may be correspondingly different. The second wavelength of the light re-emitted by the fluorescent material 14 may be between about 300 nanometres (nm) and about 600 nm.

The fluorescent material 14 may include a fluorophore material. Fluorophore materials absorb light energy of specific wavelengths and re-emit light at longer wavelengths. Accordingly, when irradiated with a spectrum of wavelengths, the fluorophore material generates an entire new range of transitions that populate various vibrational energy levels of excited states. Absorption and excitation spectra of fluorophore material are distinct, but may overlap to obtain a smooth broad spectral bandwidth light source with varied spectral intensity at each wavelength. The fluorophore material may be varied, altered and matched to generate a unique spectra of emitted light for a specific group of arthropods.

The fluorophore material may include an optical brightening agent (OBA). The term "optical brightening agent" refers to any chemical compound that absorbs light in the ultraviolet or violet region (between about 340 nm to about 370 nm) of the electromagnetic spectrum and re-emits the light in the blue region (between about 420 nm to about 470 nm) by fluorescence. The optical brightening agent may be any commercially available OBA such as, for example, those used to "whiten" paper or plastic. The fluorescent material 14 may include one or more optical brightening agents, giving the fluorescent material 14 the ability to generate one or more different wavelengths when excited by the ultraviolet light source 16. These single or multiple emission wavelengths generated by the fluorescent material 14 when excited by the ultraviolet light source 16 may be selected to match specific optimal positive phototaxis wavelengths of individual or various species of arthropods.

An emissive surface may be provided by combining the substrate 12 and the fluorescent material 14. The fluorescent material 14 may be surface coated onto, molded with, embedded into, printed onto, glued onto or fabricated with the substrate 12.

The ultraviolet light source 16 serves as an excitation light source to provide uniform irradiation onto the emissive surface of the substrate 12 having the fluorescent material 14. The ultraviolet light source 16 may emit a narrow spectral bandwidth light with a peak spectral intensity at its fundamental wavelength. In one or more embodiments, the ultraviolet light source 16 may radiate light at a wavelength of between about 100 nm and about 400 nm. Accordingly, the first wavelength may be between about 100 nm and about 400 nm. The ultraviolet light source 16 may be one or more light-emitting diodes (LEDs). Advantageously, this enhances the durability of the arthropod lure or repellent 10 and allows the arthropod lure or repellent 10 to function for several thousand hours without having to replace the one or more LEDs. The LEDs may be independently adjusted to emit light at different wavelengths and/or spectral intensities.

Figure 2:
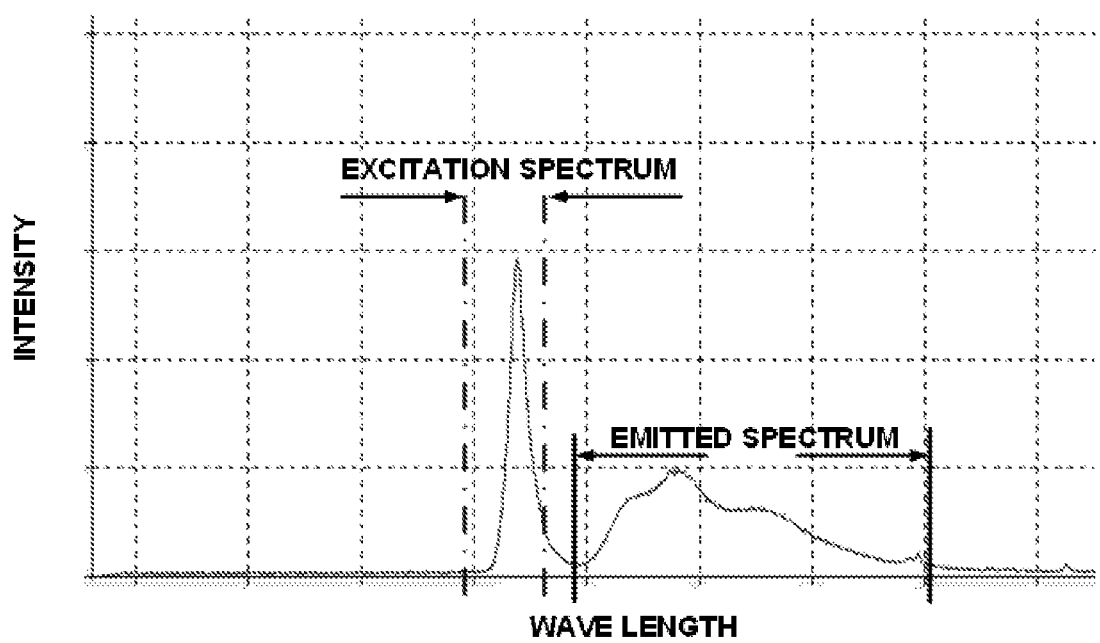
FIG. 2 is a graph of excitation and emission spectra of the arthropod lure or repellent of FIG. 1.

Referring now to FIG. 2, a combined spectrum made up of an excitation spectrum of the light emitted from the ultraviolet light source 16 and an emitted spectrum of the light re-emitted by the fluorescent material 14 is shown. In the present embodiment, the ultraviolet light source 16 is a 365 nm excitation light source LED with a spectral bandwidth of about 9 nm. In alternative embodiments, the ultraviolet light source 16 may emit light with a spectral bandwidth centred around the emitted or first wavelength of between about 2 nm and about 100 nm. Spectral bandwidth, defined as wavelength interval in which a radiated spectral intensity is not less than half its maximum value, provides a measure of the extent of the spectrum. The spectral bandwidth of the light re-emitted by the fluorescent material 14 centred around the second wavelength may be between about 10 nm and about 600 nm. In one or more embodiments, the spectral bandwidth centred around the second wavelength may be between about 20 nm and about 500 nm.

As can be seen from FIG. 2, the ultraviolet light source 16 radiates light of a shorter wavelength (higher frequency or energy) onto the fluorescent material 14, which in turn emits a longer wavelength light (lower frequency or energy). In this manner, a Stokes shift is performed by the fluorescent material 14. Spectral intensity of the radiation spectrum, defined as radiant intensity per unit frequency or wavelength, is also reduced when re-emitted as shown by the emission spectrum. The lower spectral intensity of the emitted spectrum is due to absorption of the excitation energy by the fluorescent material 14 and the emitted spectrum thus has lower spectral intensity and a larger spectral bandwidth. This results in a spread spectrum of different wavelengths of light combining the radiation spectrum from the ultraviolet light source 16 and the emission spectrum from the fluorescent material 14 to mimic natural arthropod attractants or repellents. Advantageously, this increases the phototaxis response of targeted arthropods and helps to maximize exploitation of the spectral sensitivity of arthropods.

Referring again to FIG. 1, a combined spectrum of light may thus be produced using a narrow spectral bandwidth excitation light source LED 16 to irradiate onto fluorescent material 14 applied onto the substrate 12. The excitation light spectrum is partially absorbed by the fluorescent material 14, which then emits a different spectrum of light with a broader spectral bandwidth due to the Stokes shift effect. As can be seen from FIG. 1, in the present embodiment, both the excitation spectrum irradiated from the ultraviolet light source 16 and the emitted spectrum re-emitted by the fluorescent material 14 may be irradiated outwards. The combined spectrum made up of the excitation spectrum and the emitted spectrum forms a broad bandwidth spectrum of light to attract or repel various species of targeted arthropods. The combined spectrum may have wavelengths of between about 240 nm and about 600 nm and a spectral bandwidth of between about 20 nm and about 500 nm.

Figure 3:
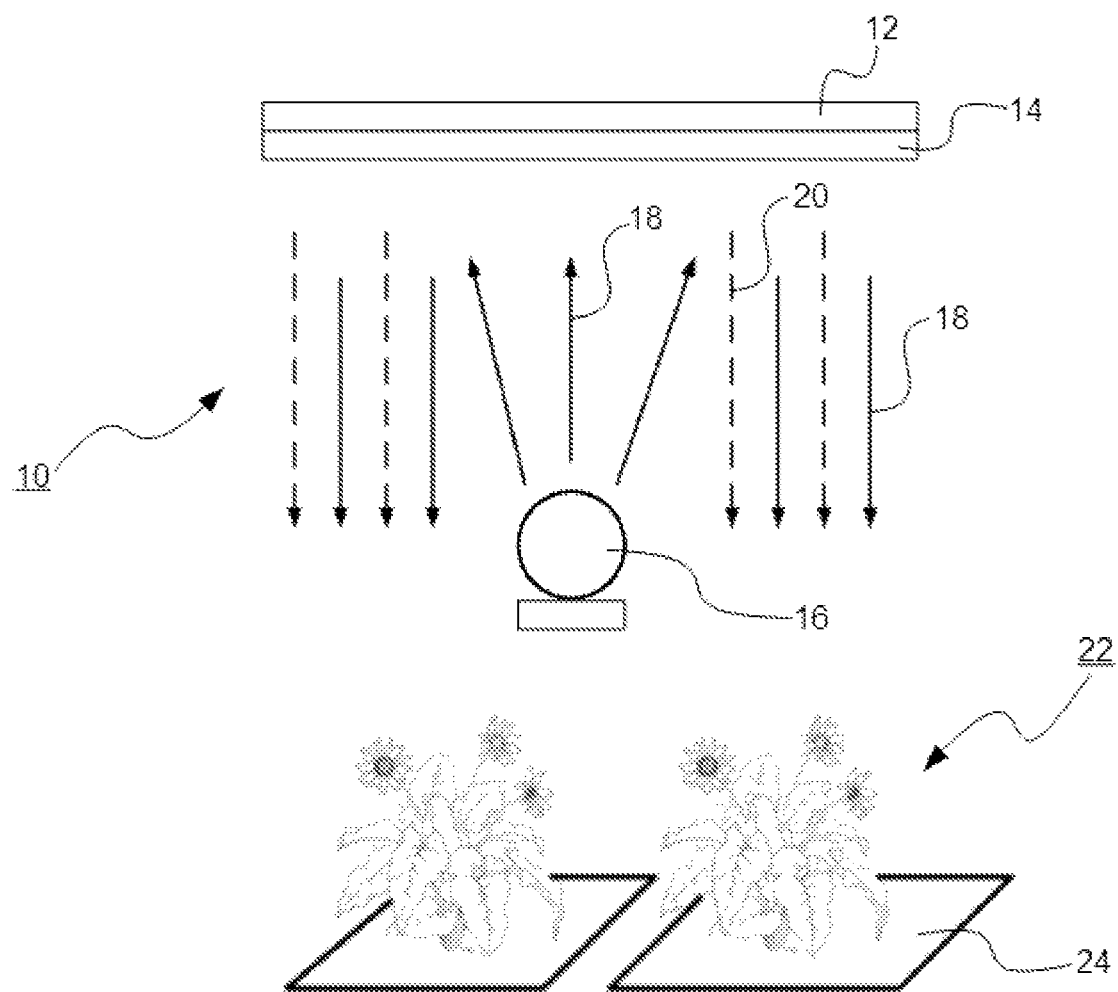
FIG. 3 is a schematic diagram illustrating the arthropod repellent of FIG. 1 in use.

Referring now to FIG. 3, an application of the arthropod repellent 10 is shown. In the embodiment shown, the arthropod repellent 10 is disposed directly above the plants 22 to provide artificial lighting for growing plants 22. The arthropod repellent 10 may thus be used to grow the plants 22 with artificial light, whilst simultaneously repelling arthropods with the combined spectrum of light. The distance of the arthropod repellent 10 from the plants 22, the spectral bandwidth and the spectral intensity may be varied based on specific plant requirements such as, for example, growth stage, flowering stage or negative phototaxis of arthropods. An additional fluorescent surface 24 with negative phototaxis capabilities may be placed beneath and/or around the plants 22 to enhance the negative phototaxis environment, ensuring that both tops and bottoms of leaves, flowers, fruit and stems of the plants 22 are illuminated with negative phototaxis emissions wavelengths. Advantageously, this helps to reduce plant damage by arthropods. The additional fluorescent surface 24 has no impact on plant growth and may be removed when insect pollination is required during flowering stages and replaced once the flowers are successfully pollinated.

Figure 4:
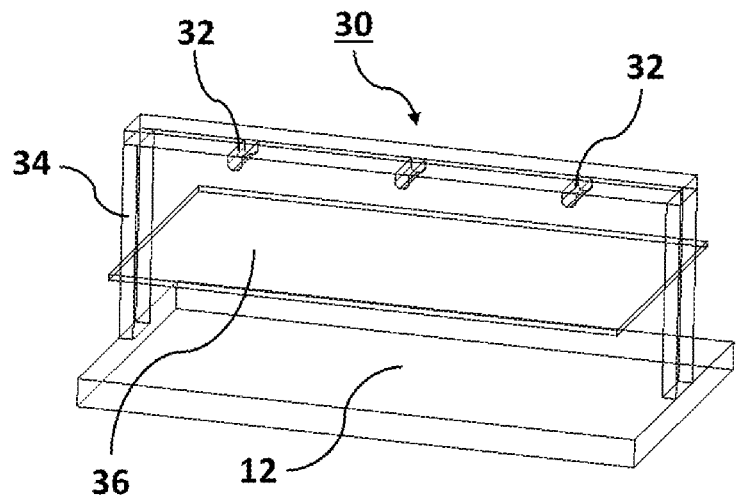
FIG. 4 is a schematic perspective view of an arthropod lure or repellent in accordance with another embodiment of the present invention.

Referring now to FIG. 4, an arthropod lure or repellent 30 in accordance with another embodiment is shown. The arthropod lure or repellent 30 of the present embodiment differs from the previous embodiment in that the ultraviolet light source 32 is provided in the form of a plurality of narrow spectral bandwidth excitation light source LEDs mounted onto a supporting structure 34 to provide uniform irradiation of the emissive surface of the substrate 12.

The emissive surface of the substrate 12 may be constructed in the form of three-dimensional surfaces such as, for example, curved surfaces, spheres, cubes or cones to increase insect attraction or repellence and may be made from metal sheets, rods or tubes. The ultraviolet light source 32 may be arranged to project onto the emissive surface of the substrate 12 in three (3) dimensions. The emissive surface of the substrate 12 may be orientated substantially opposite or perpendicular to the excitation light source 32.

Specific lighting arrangements may be used to maximize either positive or negative phototaxis responses of the arthropods, depending on the field of application. The excitation source LEDs 32 may be selected for specific applications and may be spaced apart from one another by an appropriate distance. In alternative embodiments, the excitation source LEDs 32 may be provided in a grid formation. By configuring the lighting arrangement to initiate a Stokes shift, specific wavelengths of light may be customized to maximize target species capture or repellence. Selection of the excitation source LEDs 32 may depend on factors such as, for example, LED type, spectral intensity, spectral bandwidth and viewing angle in order to achieve a maximum attraction or repellence effect for the targeted arthropods. The excitation source LEDs 32 may be selected to emit different wavelengths of light and/or different spectral bandwidths to emissive surface of the substrate 12 to attract or repel various species of targeted arthropods. The LEDs 32 may be mounted directly above or at an angle to the emissive surface of the substrate 12 such that the combined spectrum is omni-directional.

Apart from LED type, spectral intensity of the ultraviolet light source 32 may also be determined by an electrical current (measured in milliamperes) passing through the LEDs with a higher current producing a higher spectral intensity of light. The spectral intensity of the individual LEDs 32 may be adjusted independently from one another by independently adjusting the current running through the LEDs 32.

Additionally, one or more filters 36 arranged to filter the re-emitted light from the fluorescent material 14 may be provided to reduce the spectral intensity if required. The one or more filters 36 may be one or more absorptive optical filters or one or more dichroic optical filters to remove repellent light in an attraction trap or attractive light from a repellent product.

In alternative embodiments, the supporting structure 34 may be configured to hold the LEDs 32 at different distances and angles in a substantially rigid position from the emissive surface of the substrate 12. The angle of irradiation may be adjusted to generate a maximum combined light spectrum. In one embodiment, the ultraviolet light source 32 may be mounted on a cross-member that is perpendicular at any angle.

As will be appreciated by those of ordinary skill in the art, different configurations and sizes of the ultraviolet light source 32 and the supporting structure 34 may be employed depending on size requirements of the arthropod lure or repellent 30.

Figure 5:
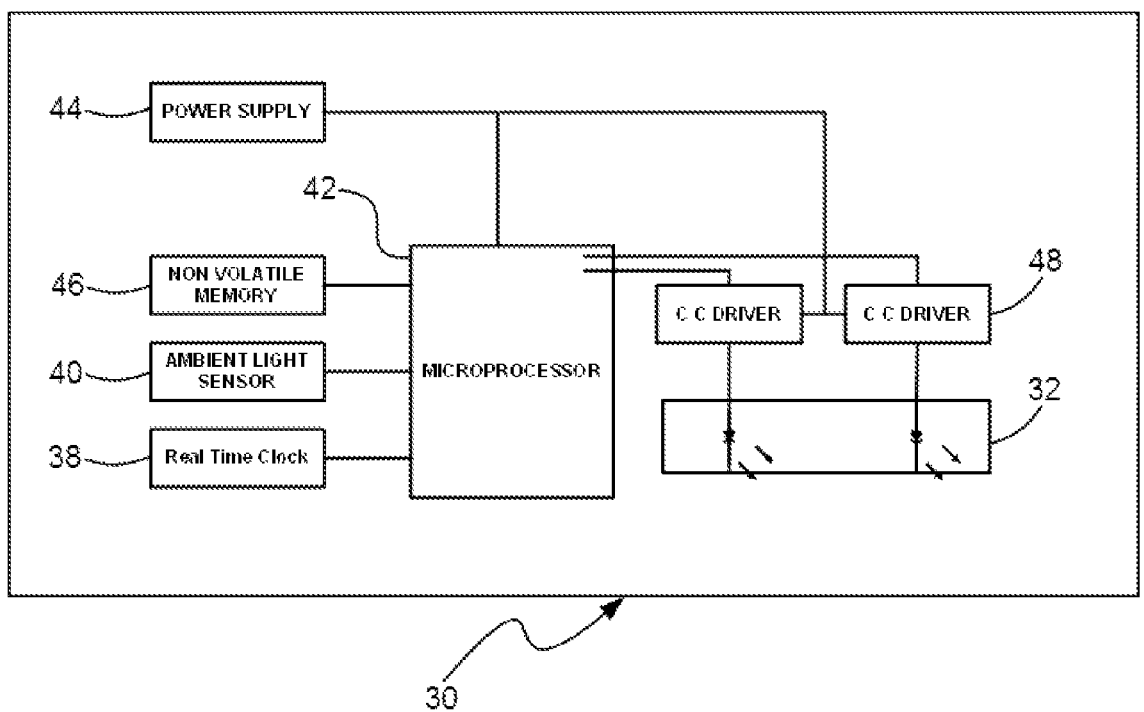
FIG. 5 is a schematic block diagram illustrating electrical elements of the arthropod lure or repellent of FIG. 4.

Referring now to FIG. 5, electrical elements of the arthropod lure or repellent 30 of FIG. 3 are shown. As can be seen from FIG. 4, the arthropod lure or repellent 30 may include a clock 38 and/or an ambient sensor 40, and a processor 42 configured to control operation of the ultraviolet light source 32 based on one or more readings from the clock 38 and/or the ambient sensor 40. The arthropod lure or repellent 30 may further include a power source 44 configured to supply power to the ultraviolet light source 32, a non-volatile memory 46 coupled to the processor 42 and one or more constant current drivers 48 configured to adjust the spectral intensity of the ultraviolet light source 32.

Operation and control of the arthropod lure or repellent 30 may be managed via the microprocessor 42 connected to the real time clock 38 and the ambient sensor 40. The real time clock 38 may work with the processor 42 to alter the spectra and its spectral bandwidth and spectral intensity to adapt to different arthropods that are active at different times of the day. Similarly, the ambient light sensor 40 may work with the processor 42 to alter the spectra and its spectral bandwidth and spectral intensity to adapt to different arthropods that are active at different ambient light conditions. The processor 42 may be configured to continuously adjust the spectral intensity of the excitation light source LEDs 32, the spectrum of the excitation light source LEDs 32, and the number of excitation light source LEDs 32 to be switched on based on information from the real time clock 38, and to manage power usage of the excitation light source LEDs 32 based on ambient light and time of the day. Operation timing sequence may be stored in the non-volatile memory 46.

Figure 6A:
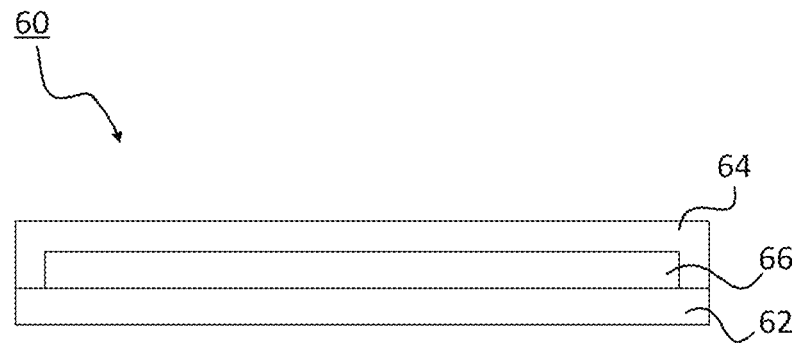
FIGS. 6A and 6B are schematic cross-sectional views of arthropod traps in accordance with embodiments of the present invention.

Referring now to FIG. 6A, an arthropod trap 60 in accordance with one embodiment is shown. The arthropod trap 60 includes a substrate 62, a fluorescent material 64 attached to the substrate 62, and an arthropod immobilizer 66 arranged to immobilize one or more arthropods attracted by the fluorescent material 64. The fluorescent material 64 is arranged to absorb light of a first wavelength and re-emit the light at a second wavelength, the second wavelength being longer than the first wavelength.

In the present embodiment, the arthropod immobilizer 66 is an adhesive material applied over at least a portion of the substrate 62. Accordingly, the substrate 62 of the present embodiment may be an adhesive board to which the fluorescent material 64 is applied and may include any solid surface such as, for example, those of paper, cardboard, wood, cork, plastic such as polyester, polyurethane, polyamide, polycarbonate, polyolefin, etc., woven and nonwoven fabric such as cotton, polyester, polyolefin, nylon, etc., metals such as aluminum, iron, etc., glass, fused silica, ceramic etc., including fabrics made therefrom. Although shown as having a planar surface, the substrate 62 may have a curved surface or form a three-dimensional structure in alternative embodiments. The substrate 62 may also be provided in a variety of colours such as, for example, yellow, black, white and/or grey to attract targeted arthropods.

The adhesive material 66 may be applied over between about 25 percent (%) and 100% of a surface of the substrate. The adhesive material 66 may be UV resistant. Advantageously, as the adhesive material 66 may be exposed to intense ultraviolet (UV) light concentrations emitted from UV light sources, the UV resistance helps the adhesive material 66 withstand degradation associated with UV exposure. The adhesive material 66 may be resistant to UV light having a wavelength of between about 200 nm and about 400 nm.

The fluorescent material 64 serves as a visual attractant layer that generates a positive phototaxis response in targeted arthropods when irradiated with an ultraviolet (UV) light source. More particularly, the fluorescent material 64 exhibits the phenomenon of "Stokes shift" when exposed to a specific UV light source, irrespective of the orientation of the UV light source. When irradiated with UV light, the visual attractant layer absorbs the UV light and re-emits a spectrum of light that mimics the natural visual attractants used by carnivorous plants e.g., Sarraceniaceae, to lure and attract targeted arthropods, initiating positive phototaxis responses in the targeted arthropods and luring the arthropods onto the adhesive surface 66 of the substrate 62 where the arthropods become immobilized. Accordingly, the second wavelength of the light re-emitted by the fluorescent material 64 may be between about 300 nanometres (nm) and about 600 nm. The fluorescent material 64 may be arranged to re-emit the light at a spectral bandwidth centred around the second wavelength of between about 10 nm and about 600 nm. In one or more embodiments, the spectral bandwidth centred around the second wavelength may be between about 20 nm and about 500 nm. The immobilized arthropods eventually die on the adhesive surface 66 of the substrate 62 and are thus removed from the general environment.

The fluorescent material may include a fluorophore material as described above. The fluorophore material may be a fluorescent chemical compound that can re-emit light upon light excitation. Fluorophores typically contain several combined aromatic groups, or planar or cyclic molecules with several π bonds. Several combinations of different fluorophore materials may be used simultaneously on visually attractive adhesive substrates, which would generate different spectra of emission simultaneously. As geographical variations of arthropods are triggered by different positive phototaxis responses, the use of several different fluorophore materials simultaneously provides targeted combinations of emitted wavelengths to geographically different arthropods.

The fluorophore material may include an optical brightening agent (OBA) as described above.

The fluorescent material 64 may be printed onto, coated onto, laminated over, covered by, textured over, patterned over or manufactured with the substrate 62.

Figure 6B:
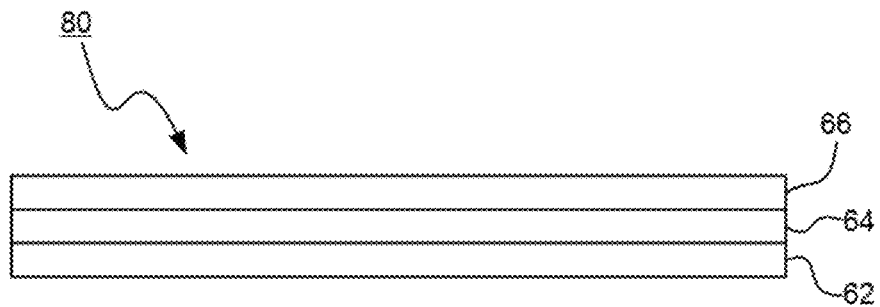

Referring now to FIG. 6B, an arthropod trap 80 in accordance with another embodiment is shown. The arthropod trap 80 of the present embodiment differs from the previous embodiment in that the fluorescent material 64 is applied to the substrate 62 before the adhesive material 66.

Although illustrated as being provided as separate layers in the two preceding embodiments, the fluorescent material 64 may be disposed within the adhesive material 66 or strategically applied to portions of the substrate 62 in alternative embodiments. For example, the fluorescent material 64 may be in the form of fluorophore nanoparticles or compounds and may be mixed, embedded, impregnated or dispersed within the adhesive material 66 used to coat the substrate 62.

Referring now to FIGS. 7A through 7G, the fluorescent material 64 and the adhesive material 66 may be selectively coated on a surface of the substrate 62 as shown.

Figure 7A:
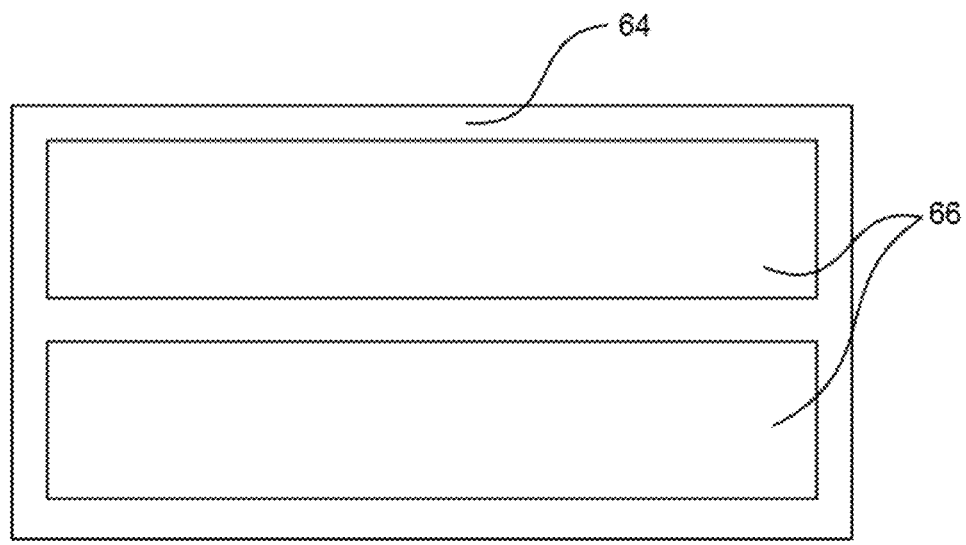
FIGS. 7A through 7G are schematic top plan views of arthropod traps in accordance with embodiments of the present invention.
Figure 7B:
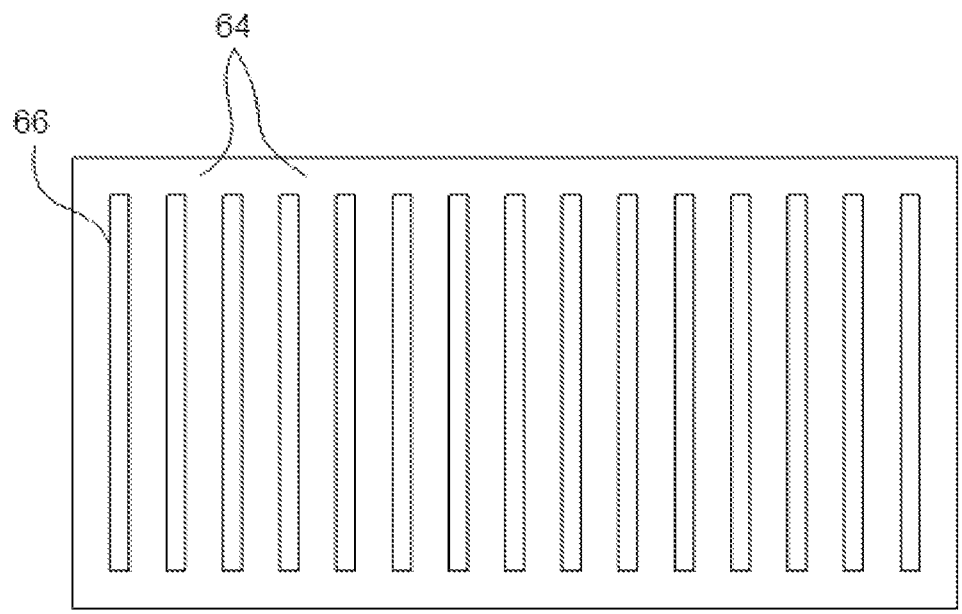
Figure 7C:
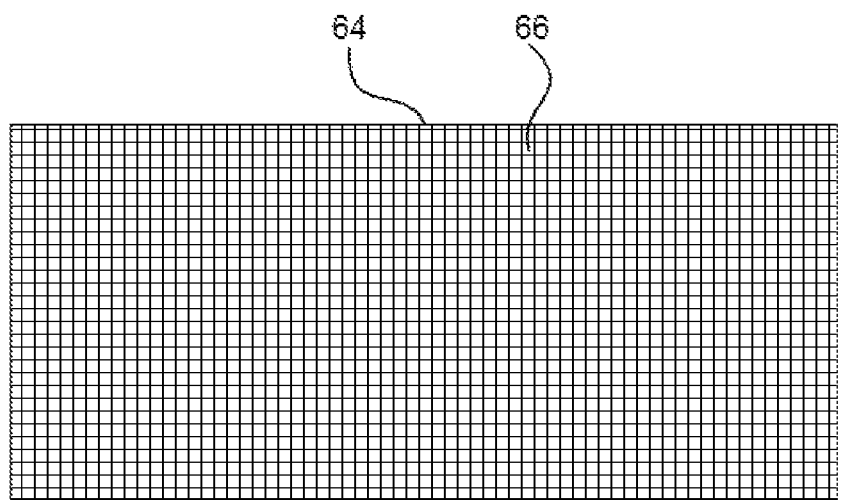
Figure 7D:
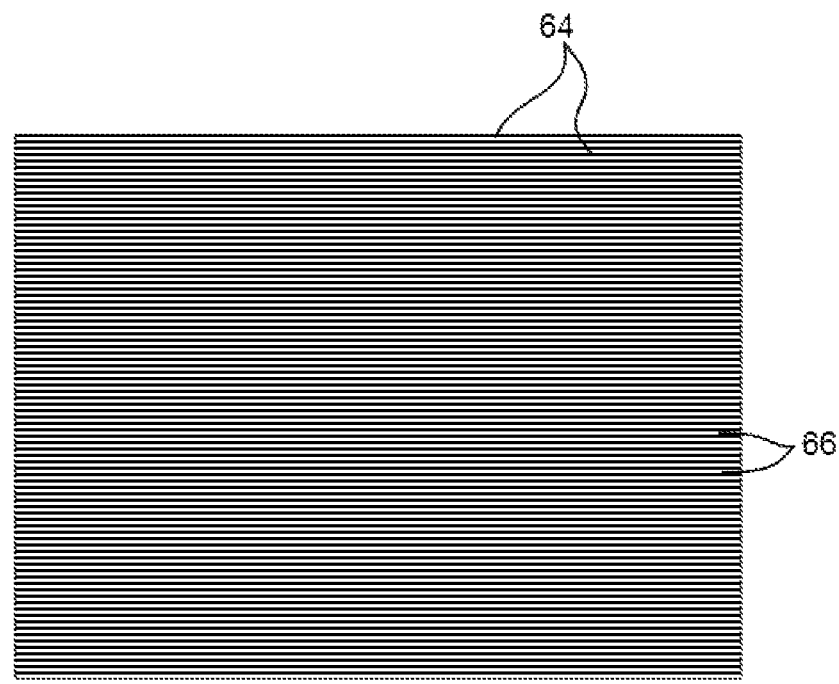
Figure 7E:
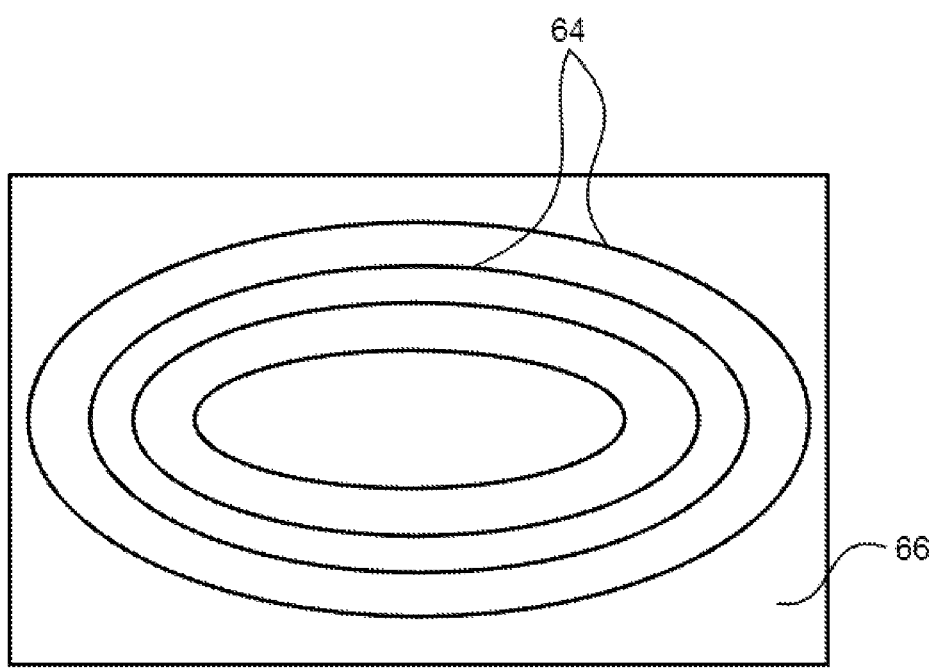
Figure 7F:
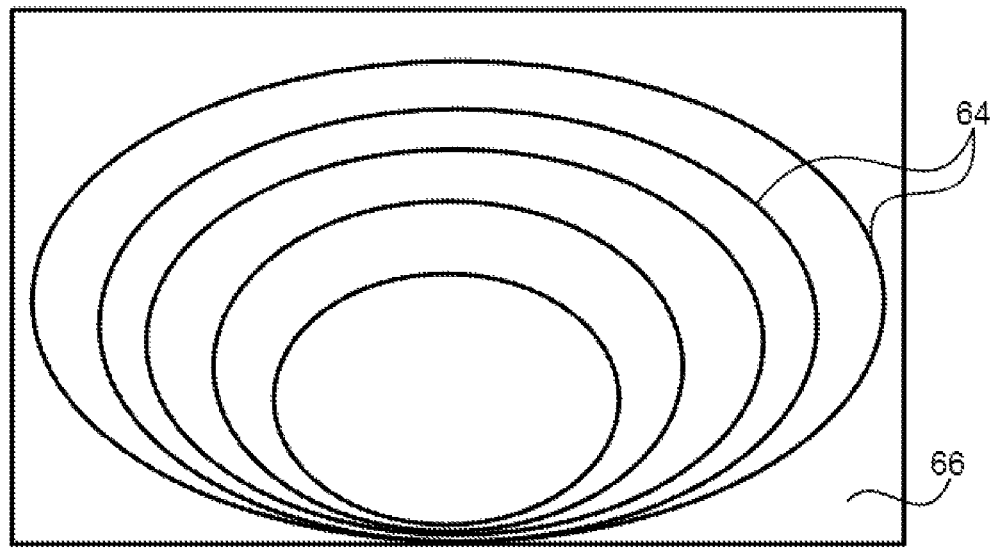
Figure 7G:
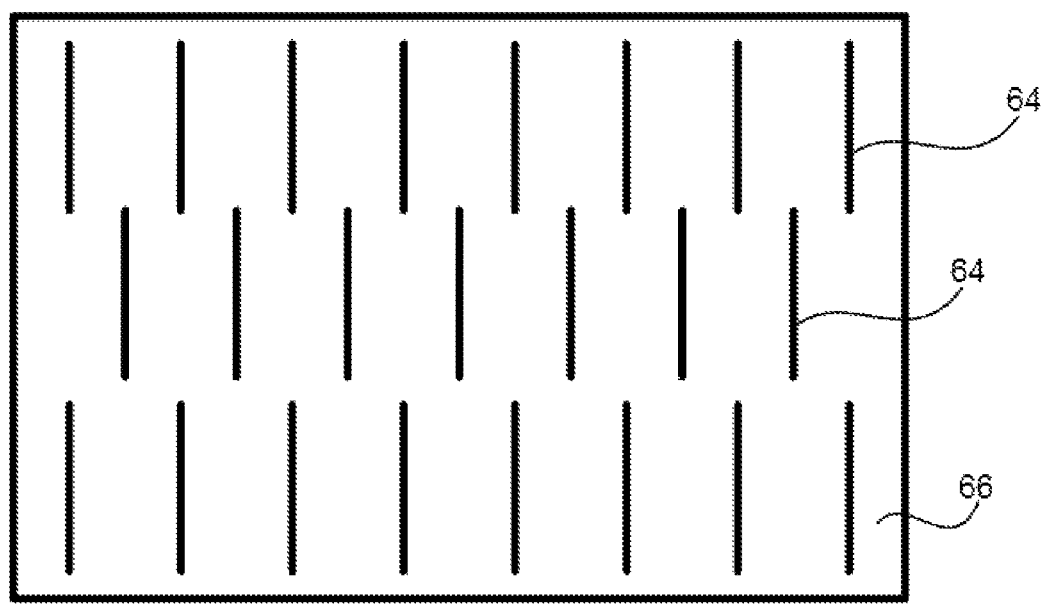

In the embodiment shown in FIG. 7A, the fluorescent material 64 is applied directly onto the substrate 62 and surrounds adhesive regions 66. In this embodiment, the adhesive material 66 coats at least a majority portion of the surface of the substrate 62 and remaining portions are taken up by the fluorescent material 64 with the fluorescent material 64 surrounding the adhesive material 66.

FIGS. 7A through 7G illustrate exemplary patterned coverage areas of the fluorescent material 64 and the adhesive material 66 on the substrate 62. As can be seen from FIGS. 7A through 7G, various patterns of the fluorescent material 64 may be orientated to form symmetrical or unsymmetrical patterns to cast different patterns that may be attractive to targeted arthropods and generate positive phototaxis responses in the targeted arthropods.

Figure 8:
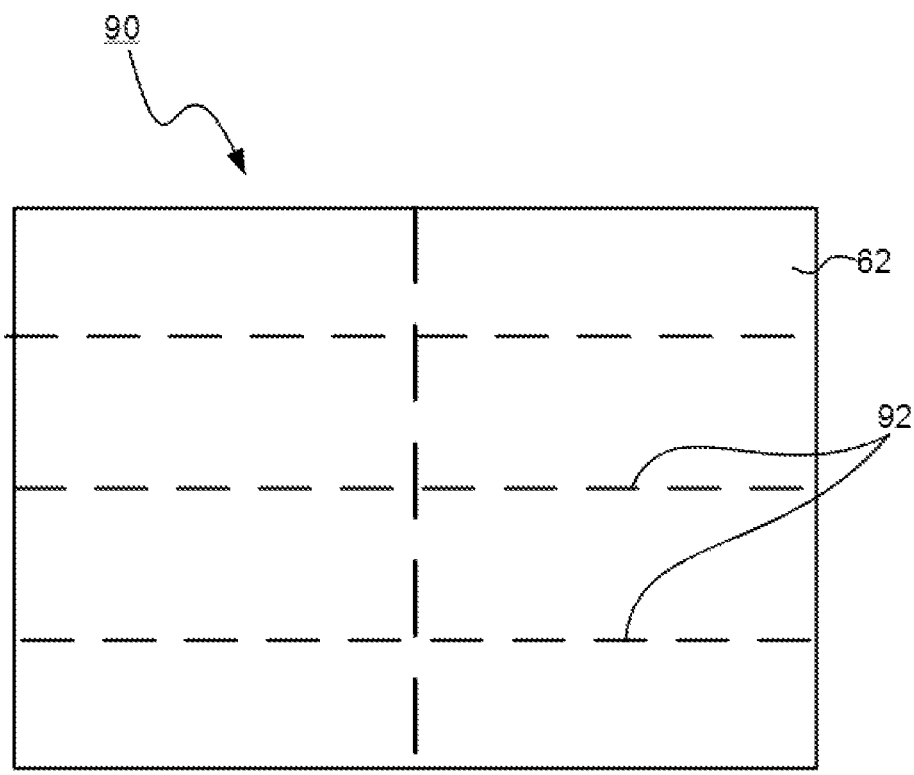
FIG. 8 is a schematic top plan view of an arthropod trap in accordance with an embodiment of the present invention.

Referring now to FIG. 8, an arthropod trap 90 in accordance with yet another embodiment is shown. The arthropod trap 90 of the present embodiment differs from the previous embodiments in that the substrate 62 includes a plurality of perforations 92 for easy sectioning of the arthropod trap 90 into different sizes. In alternative embodiments, various combinations of perforations 92 may be provided in the substrate 62 depending on application requirements.

The arthropod traps 60, 80 and 90 may serve as arthropod luring adhesive boards that induce positive phototaxis responses in arthropods, attracting the arthropods into contact with the adhesive material 64 and immobilizing the arthropods on the adhesive material 64, eventually killing the arthropods in the process.

Figure 9:
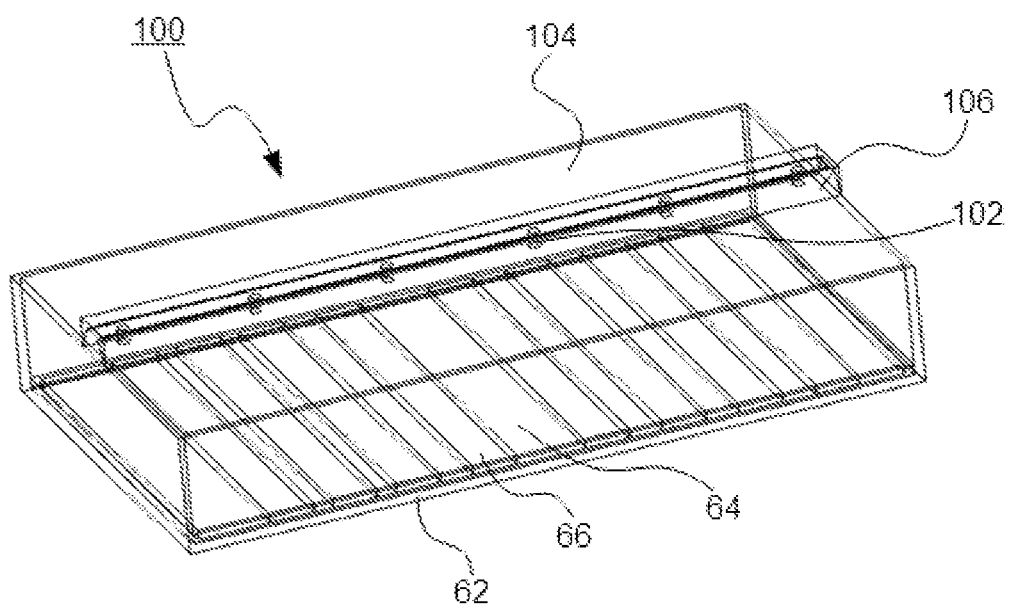
FIG. 9 is a schematic perspective view of an arthropod trap in accordance with another embodiment of the present invention.

Referring now to FIG. 9, an arthropod trap 100 in accordance with a further embodiment is shown. The arthropod trap 100 of the present embodiment differs from the previous embodiments in that the arthropod trap 100 includes an ultraviolet (UV) light source 102 and a housing 104. The ultraviolet (UV) light source 102 is arranged to illuminate the fluorescent material 64 with the light of the first wavelength. The substrate 62, the arthropod immobilizer 66 and the ultraviolet light source 102 are received in the housing 104.

In the present embodiment, the adhesive surface 66 is patterned with the fluorescent material 64 to form a patterned emissive surface 64 against the adhesive surface 66, thereby combining the adhesive and emissive surfaces into a unified surface having both positive phototaxis and immobilization capabilities.

The arthropod trap 100 uses a combined spectrum of light to obtain an effective arthropod capture rate. Ultraviolet (UV) light is an important navigational visual cue for many arthropods. Specific wavelengths and intensities of light are absorbed by Rhodopsin pigments in compound eyes of arthropods which initiates an electrical signal in the nervous system of an arthropod. The stimulated nervous system initiates muscle movements in the legs or wings of the arthropods, moving them to (positive phototaxis) the source of light. The arthropod trap 100 utilizes the ultraviolet light source 102 to initiate positive phototaxis responses to lure arthropods into the arthropod trap 100 where the arthropods may eventually be killed. When irradiated with the UV light, the patterned emissive surface 64 generates an increased positive phototaxis response in targeted arthropods by emitting a spectrum of light that mimics naturally occurring attractant wavelengths of light for arthropods.

The ultraviolet light source 102 may be a plurality of UV light sources arranged in the arthropod trap 100 to uniformly irradiate the patterned emissive surface 64 on the substrate 62. The UV light sources 102 may be independently adjusted to emit light at different wavelengths and/or spectral intensities. In the present embodiment, the ultraviolet light source 102 may be an LED array adapted to provide bespoke spectral intensity and spectral bandwidth for use to attract or repel different species of targeted arthropods. The light of the first wavelength emitted by the ultraviolet light source may be between about 200 nm and about 400 nm. The fluorescent material 64 performs specific spectrum conversions of narrow spectrum wavelengths of light from the ultraviolet light source 102 into an enhanced broad spectrum of light. In this manner, the arthropod trap 100 is illuminated with the enhanced spectrum of light for achieving higher attraction rates of targeted arthropods. The arthropod trap 100 may be provided with associated electronics to control the ultraviolet light source 102.

The housing 104 includes outward facing openings that permit arthropods to catch sight of the emissive surface 64 in the arthropod trap 100. The openings facilitate projection of the combined spectrum of light outwardly and away from the emissive surface 64, increasing visibility of the combined spectrum of light by the arthropods. The housing 104 may be made of a plastic or metallic material. Advantageously, encasing the arthropod trap 100 in a housing makes the arthropod trap 100 more durable for indoor or outdoor use.

In the present embodiment, a filter 106 arranged to filter the re-emitted light from the fluorescent material 64 may be provided between the patterned emissive surface 64 and first visualization by an arthropod to remove repellent light in the arthropod trap 100. The filter 106 may be may be an absorptive optical filter or a dichroic optical filter to remove repellent light in the arthropod trap 100.

Figure 10:
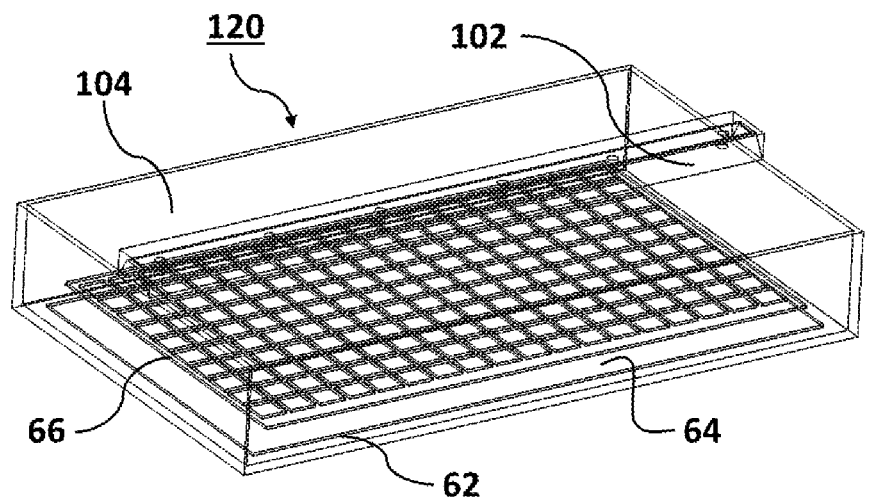
FIG. 10 is a schematic perspective view of an arthropod trap in accordance with yet another embodiment of the present invention.

Referring now to FIG. 10, an arthropod trap 120 in accordance with another embodiment is shown. The arthropod trap 120 of the present embodiment differs from the previous embodiments in that the arthropod immobilizer 66 of the present embodiment is an electrocuting grid adjacent the substrate 62. The electrocuting grid 66 may be positioned in front of or behind an emissive surface supporting the fluorescent material 64. In the present embodiment, the electrocuting grid 66 is positioned in front of the emissive surface 64. When the electrocuting grid 66 is positioned behind the emissive surface 64, the substrate 62 may be provided with a plurality of voids (not shown) to allow arthropods to pass through to the electrocuting grid 66 where the arthropods become immobilized on coming into contact with the electrocuting grid 66. The voids in the substrate 62 may be grid patterned, louvered, drilled or molded. The patterned emissive surface 64 may be vertically arranged to match arthropod visual processing.

The emissive surface 64 may be made from a polymer that is transparent, translucent or opaque to the excitation light source 102.

The arthropod traps 100 and 120 shown in FIGS. 9 and 10 may include a clock and/or an ambient sensor, and a processor configured to control operation of the ultraviolet light source 102 based on one or more readings from the clock and/or the ambient sensor.

When arthropods enter the arthropod traps 100 and 120, the arthropods cannot escape and are thus removed from the general environment. The arthropod traps 100 and 120 may be vertically or horizontally mounted or suspended.

Figure 11A:
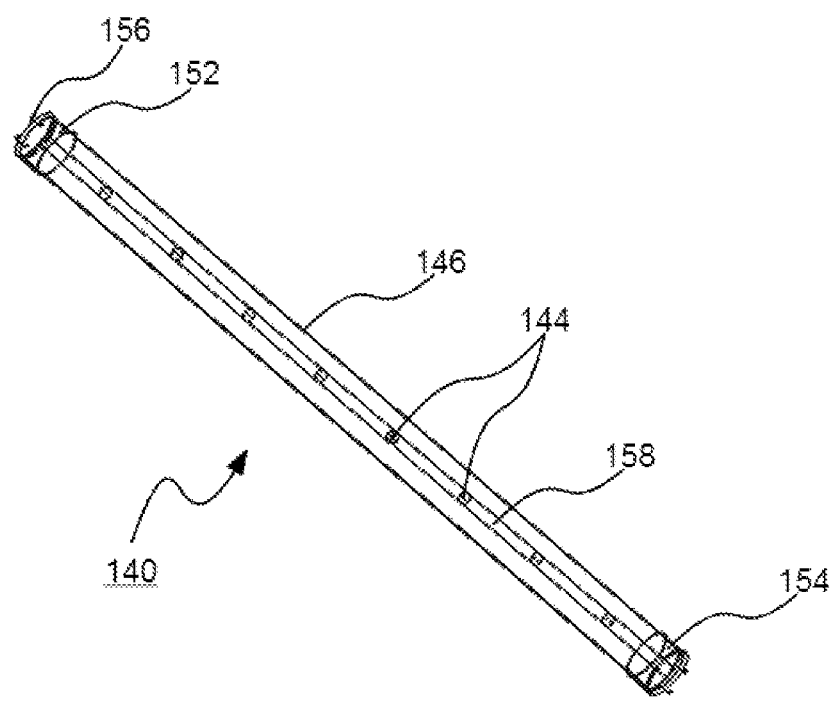
FIG. 11A is a schematic perspective view of a lighting device in accordance with an embodiment of the present invention.
Figure 11B:
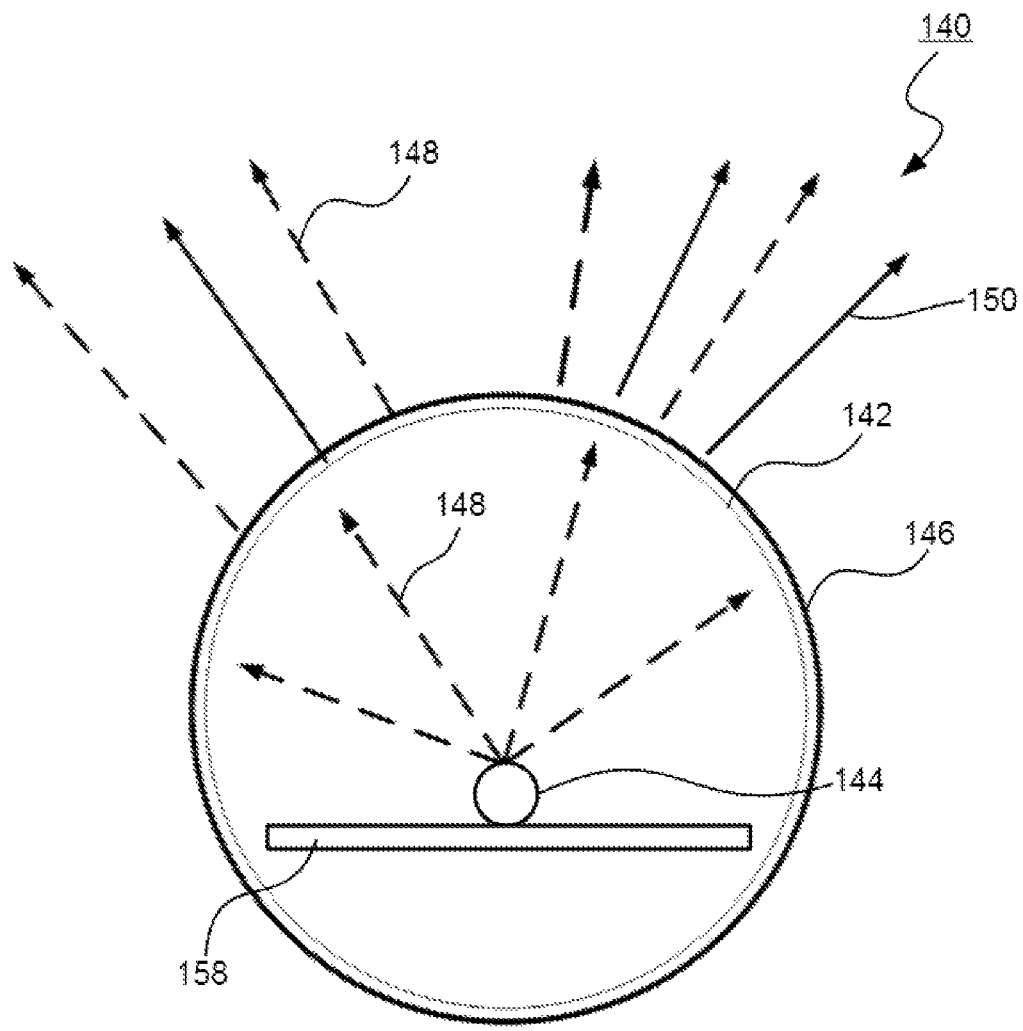
FIG. 11B is a schematic cross-sectional view of the lighting device of FIG. 11A.
Figure 12A:
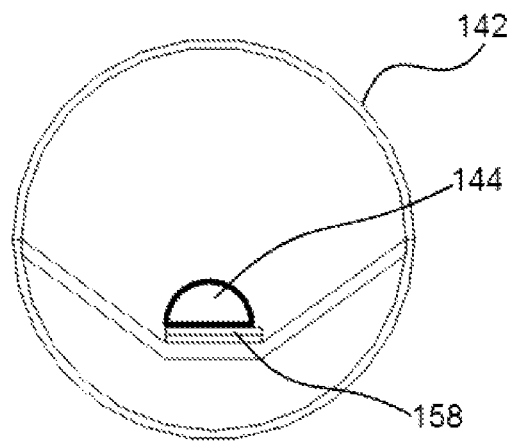
FIGS. 12A through 12F are schematic cross-sectional views of lighting devices in accordance with embodiments of the present invention.
Figure 12B:
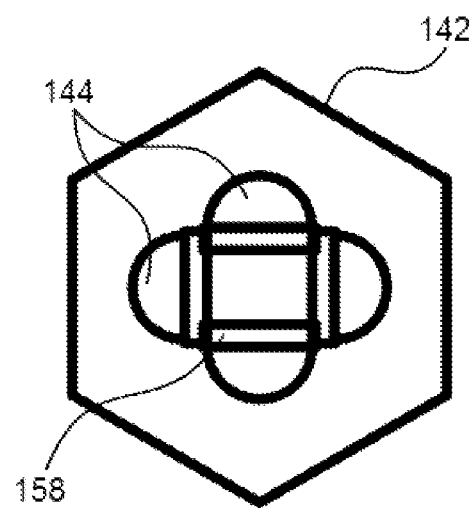
Figure 12C:
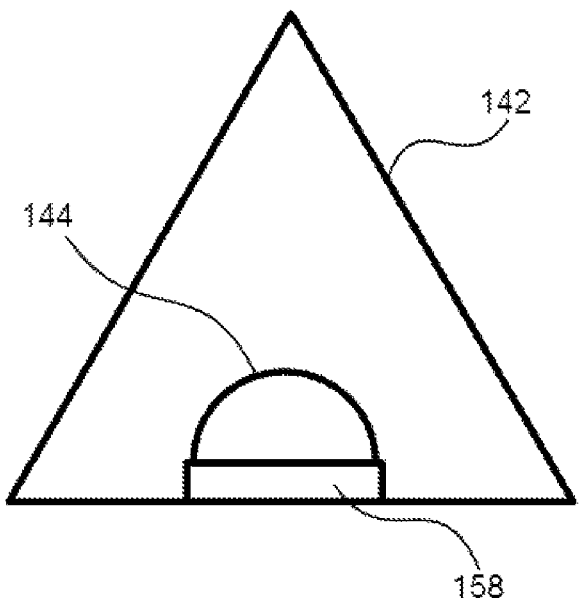
Figure 12D:
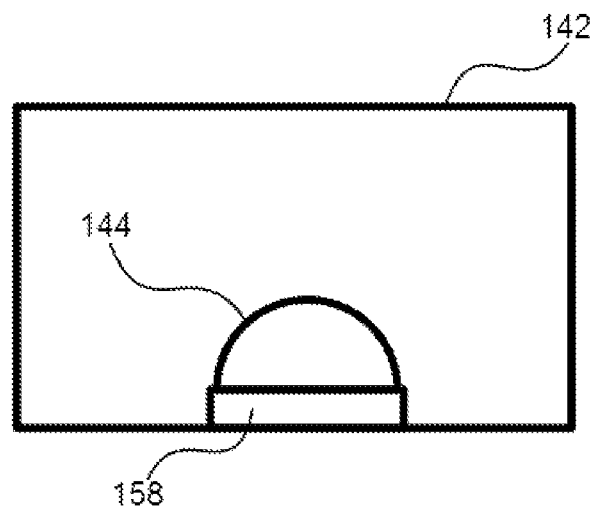
Figure 12E:
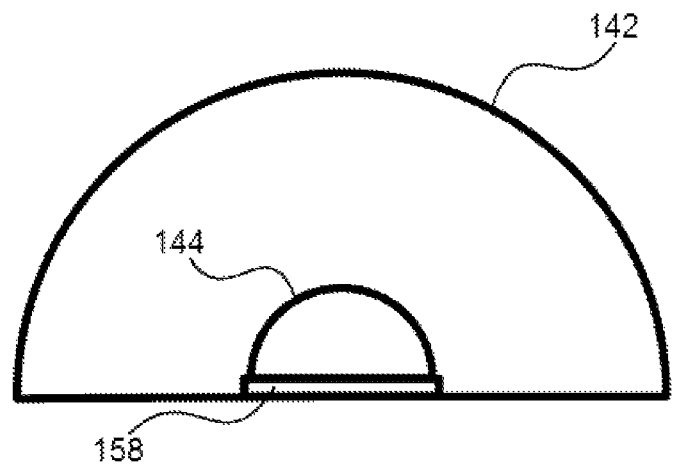
Figure 12F:
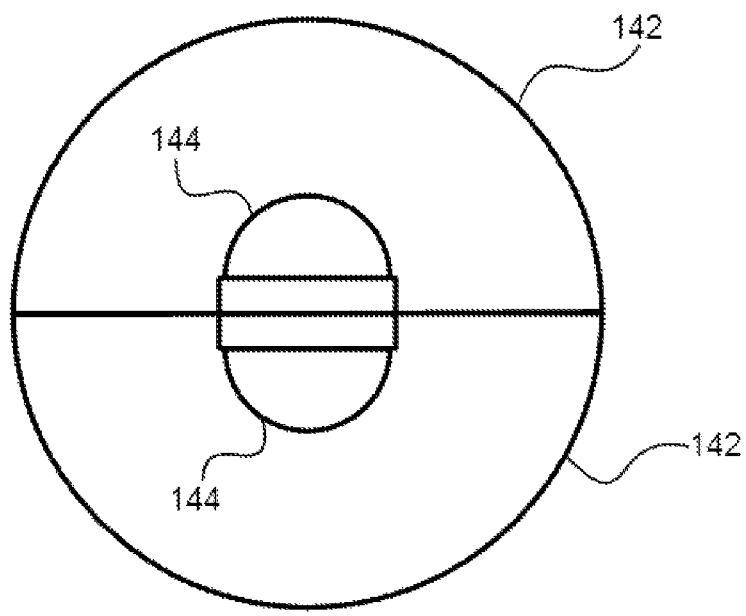

Referring now to FIGS. 11A and 11B, a lighting device 140 in accordance with one embodiment is shown. The lighting device 140 includes a housing 142, an ultraviolet light source 144 received in the housing 142, and a fluorescent material 146 on a surface of the housing 142. The fluorescent material 146 is arranged to absorb light of a first wavelength 148 from the ultraviolet light source 144 and re-emit the light at a second wavelength 150, the second wavelength 150 being longer than the first wavelength 148.

Excitation light of the first wavelength 148 from the ultraviolet light source 144 is partially absorbed by the fluorescent material 146, which then emits the light at the second wavelength 150 with a broader spectral bandwidth ("Stokes shift" effect) and a partially reduced spectral intensity. The combination spectrum of the excitation spectrum 148 and the emitted spectrum 150 forms a broad spectrum of light to attract or repel different species or genus of targeted arthropods. The lighting device 140 thus generates an enhanced light spectrum at a desired spectral intensity and spectral bandwidth by manipulating the UV light from the ultraviolet light source 144 to interact with the spectral conversion material 146 to create a desired phototaxis response in arthropods. The lighting device 140 may be used to replace conventional fluorescent UV tubes or other lamps that are used to attract or repel arthropods.

The housing 142 in the present embodiment may be a hollow tubular housing having a first end fitted with a first end cap 152 and a second end opposite to the first end fitted with a second end cap 154. Each of the end caps 152 and 154 may be provided with a pair of parallel, fluorescent light fixture electrical receptacle connectors 156 that extend from each of the end caps 152 and 154, the electrical receptacle connectors 156 being configured for installing within opposed electrical receptacles of a fluorescent lighting fixture. The housing 142 may be translucent or transparent and may be made of a flexible and shatterproof material. Placed in front of the excitation light source 144, the housing 142 forms a closed lighting system with the direction of visibility of the combined light spectrum being in the direction of excitation light from the excitation light source 144.

The ultraviolet light source 144 in the present embodiment may be a plurality of UV LEDs mounted on a printed circuit board (PCB) 158 disposed along the tubular housing 142 for electrical interconnection of the UV LEDs. The UV LEDs 144 are electrically connected to one another and with the electrical receptacle connectors 156 extending from the first and second end caps 152 and 154. An electronic LED driver (not shown) may be provided with each of the first and second end caps 152 and 154 of the tubular housing 142. The UV LEDs 144 may be positioned at predetermined distances and angles to provide uniform irradiation and minimize overlap of the UV light projected onto the illumination surface of the housing 142. For example, the UV LEDs 144 may be arranged in a linear array or in a matrix to uniformly irradiate the UV illumination on the housing 142, projecting onto the illumination surface of the housing 142 uniformly in three dimensions. The UV LEDs 144 may be independently adjusted to emit light at different wavelengths and/or spectral intensities. The light of the first wavelength 148 emitted by the ultraviolet light source 144 may be between about 100 nm and about 400 nm. The light emitted by the ultraviolet light source 144 may have a second spectral bandwidth centred around the first wavelength of between about 2 nm and about 100 nm. The UV LEDs 144 may be driven by power from an internal or external power conversion system suitable to drive the UV LEDs 144 with the required spectral intensity.

When irradiated with ultraviolet (UV) light from the ultraviolet light source 144, the fluorescent material 146 partially absorbs the ultraviolet light from the ultraviolet light source 144 and emits a partially converted spectrum of light 150 that is of a different wavelength than from the original ultraviolet light source 144. Depending on the fluorescent material 146, the emitted second wavelength may be between about 300 nanometres (nm) and about 600 nm. The fluorescent material 146 may be arranged to re-emit the light at a first spectral bandwidth centred around the second wavelength of between about 10 nm and about 600 nm. In one or more embodiments, the first spectral bandwidth centred around the second wavelength may be between about 20 nm and about 500 nm. The fluorescent material 146 may include a fluorophore material as described above. The fluorophore material may include an optical brightening agent (OBA) as described above. Advantageously, application of the fluorescent material 146 on the surface of the housing 142 helps generate a combined spectrum of wavelengths that is attractive to arthropods. A narrow spectrum wavelength from a UV LED 144 may be "Stokes shifted" and converted to provide an enhanced and broadened spectrum of light from the lighting device 140 to attract or repel different species or genus of targeted arthropods.

The fluorescent material 146 may be fabricated from compounds, materials, nanoparticles or bioactives and may be surface coated, molded, impregnated, covered, embedded, printed, glued or mounted onto the housing 142.

Although not shown, the printed circuit board 158 may include a substrate with circuit pads and may be shaped to fit the housing 142. In one or more embodiments, the printed circuit board 158 may be in the form of a flexible strip. Energy may be provided to the printed circuit board 158 via connection points electrodes. The printed circuit board 158 may be provided with a heat sink to dissipate heat generated by the printed circuit board 158.

Referring now to FIGS. 12A through 12F, cross-sectional views of different arrangements of the lighting device 140 are shown. As can be seen from FIGS. 12A through 12F, the different arrangements of the lighting device 140 may have different shapes of the housing or cover 142 and different numbers and placements of the ultraviolet light source 144 and the printed circuit board (PCB) 158.

Figure 13:
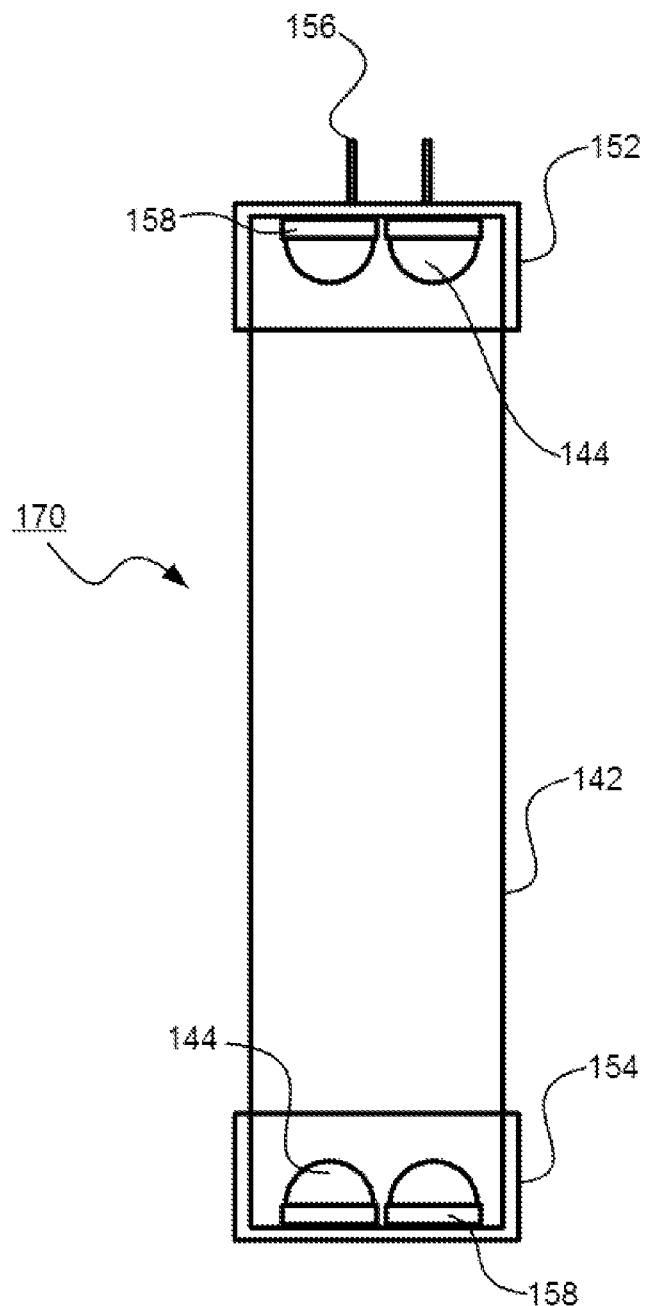
FIG. 13 is a schematic cross-sectional view of a lighting device in accordance with another embodiment of the present invention.

Referring now to FIG. 13, a lighting device 170 in accordance with another embodiment is shown. The lighting device 170 of the present embodiment differs from the previous embodiment in that the lighting device 170 is in the form of a vertically hanging tubular lamp and the ultraviolet light source 144 is in the form of ultraviolet light emitting diodes (LEDs) disposed at each end of a tubular transparent housing 142. First and second end caps 152 and 154 are disposed at respective ends of the housing 142. The housing 142 may be in hollow or solid form. The UV LEDs 144 may be mounted on printed circuit boards 158 disposed on each of the first and second end caps 152 and 154. The first and second end caps 152 and 154 are in electrical contact with one another and with the electrical receptacle connectors 156 extending from the first end cap 152. An LED driver (not shown) may be contained in at least one of the first and second end caps 152 and 154.

Figure 14A:
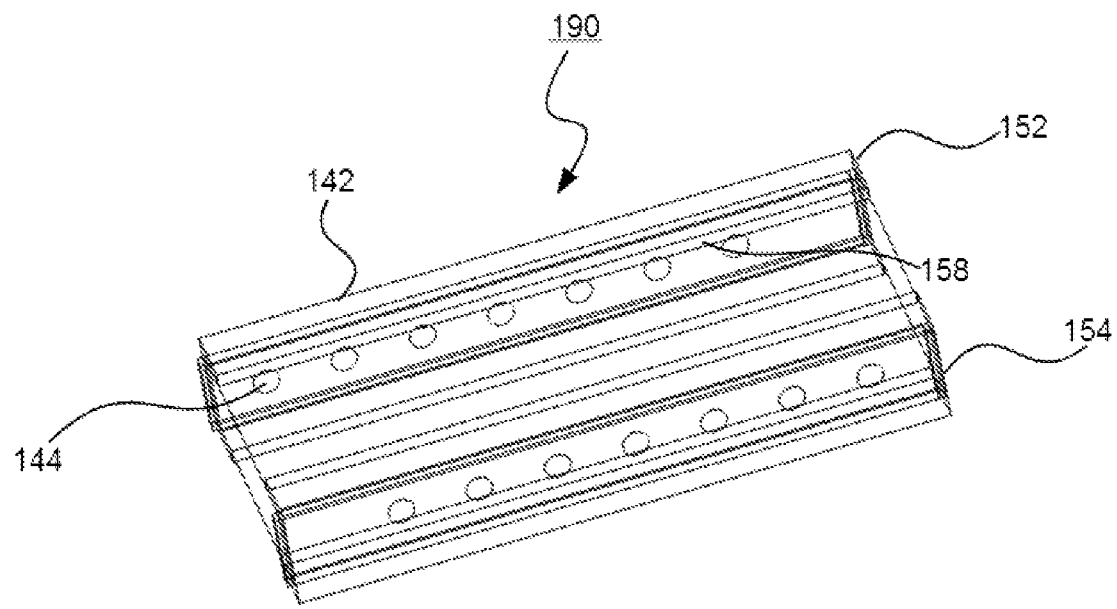
FIG. 14A is a schematic perspective view of a lighting device in accordance with yet another embodiment of the present invention.
Figure 14B:
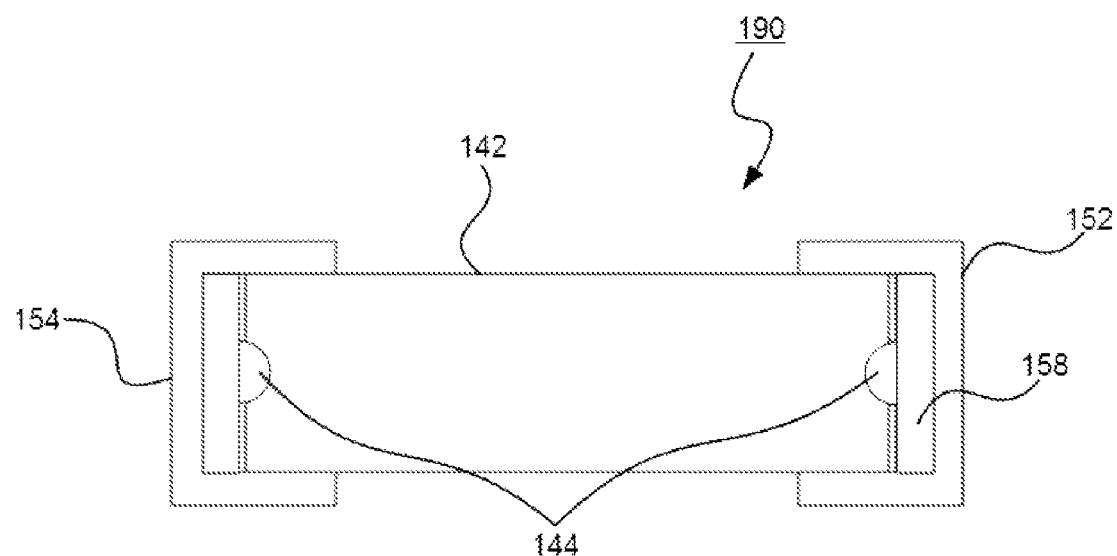
FIG. 14B is a schematic cross-sectional view of the lighting device of FIG. 14A.

Referring now to FIGS. 14A and 14B, a lighting device 190 in accordance with yet another embodiment is shown. The lighting device 190 of the present embodiment differs from the previous two embodiments in that the lighting device 190 is in the form of a light guide panel. The light guide panel 190 includes surfaces for receiving a plurality of UV LEDs 144 arranged substantially perpendicular and away from an illumination surface of the housing 142. The housing 142 includes a first portion and a second portion opposite to the first portion, the first and second portions extending between first and second ends 152 and 154. The UV LEDs 144 may be mounted on printed circuit boards (PCB) 158 at the first and second ends 152 and 154 and may be orientated to project through the transparent housing 142. The light guide panel 190 may be in hollow or solid form and the housing 142 may be made from light transmitting fluorinated ethylene propylene (FEP) or a similar polymer with high transmissivity to UV light that efficiently transmits the UV light without absorbing it. In one or more embodiments, the housing 142 may be made of a plastic material that does not degrade or become altered when exposed to UV light.

As can be seen from the preceding embodiments, the housing 142 may have different shapes and configurations depending on usage requirements. To increase arthropod attraction, the housing 142 may have be constructed in the form of round, oval, square, rectangular or polygon shaped tubes.

As is evident from the foregoing discussion, the present invention provides an arthropod lure or repellent, an arthropod trap and a lighting device lure or repellent with improved attraction and repellence rates. The insect traps or repellent surfaces of the present invention may make use of a series of two or more narrow spectra, shorter wavelength light sources positioned to reflect off fluorescent materials on a surface. The reflection surface absorbs and re-emits a new range of emission wavelengths different to the source wavelengths. The resultant combination of excitation and emission spectra is combined to create an overlapping extended spectral range, all derived from the excitation shorter wavelength light source. Both the excitation light source and the resultant emission fluorescent surface may be manipulated to produce a desired combination of an attractive (or repellent) spectrum of light visible on the emission surface. This utilization of the "Stokes shift" effect is unique to arthropod phototaxis responses and may be controlled through selection of appropriate source wavelengths and emission fluorescent materials to create a mixture of visible wavelengths that are presented to the target arthropod. Similarly, the combination lighting systems of the present invention may be adjusted to alter the spectral intensity, the zone(s) of attraction (or repellence), the wavelengths of light emitted, or a combination thereof to incorporate into capture traps or repellent products. The shorter wavelength light sources may be adjusted independently from one another such that different shorter wavelength light sources emit different wavelengths, spectral intensity, or combinations thereof, resulting in a combination emission and radiation spectra that forms a broader spectral bandwidth. Additionally, the fluorescent material may also be varied, altered and matched with the shorter wavelength light sources to generate a unique combination emission and radiation spectra that is selective to specific arthropods or groups of arthropods. Advantageously, through the manipulation of absorption and emission spectra associated with the "Stokes shift" effect to match Rhodopsin adsorption wavelengths in the eyes of specific arthropods, the present invention is able to initiate a positive or negative phototaxis response specifically for a species or genus of arthropods, thereby increasing capture or repellence rates of targeted arthropods by mimicking their natural visual attractants. Further advantageously, spectral bandwidth and spectral intensity of light may be customized in the present invention to maximize target species capture using the "Stokes shift" effect.

While preferred embodiments of the invention have been illustrated and described, it will be clear that the invention is not limited to these embodiments only. Numerous modifications, changes, variations, substitutions and equivalents will be apparent to those skilled in the art without departing from the scope of the invention as described in the claims.

Further, unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. An arthropod lure or repellent, comprising:
   a substrate;
   a fluorescent material attached to the substrate, the fluorescent material comprising different fluorophore materials for generating different spectra emissions simultaneously; and
   an ultraviolet light source arranged to illuminate the fluorescent material with light centered around a first wavelength, the ultraviolet light source comprising a plurality of light emitting diodes (LEDs) to emit different wavelengths of ultraviolet light;
   wherein the fluorescent material performs a Stokes shift on the ultraviolet light in which the ultraviolet light of the first wavelength is absorbed and re-emitted as re-emitted light having different spectra emissions centered around a second wavelength, the second wavelength being longer than the first wavelength, a spectral bandwidth of the light re-emitted by the fluorescent material centered about the second wavelength in the range of 10 nm to 600 nm, and the spectral bandwidth of the light re-emitted by the fluorescent material being larger than that of the ultraviolet light of the first wavelength, and wherein the spectra intensity of the re-emitted light by the fluorescent material is lower than that of the ultraviolet light emitted from the ultraviolet light source, and
   wherein the fluorescent material and the ultraviolet light source produce a combined spectrum made up of an excitation spectrum of the light emitted from the ultraviolet light source and the generated different spectra emissions of the light re-emitted by the fluorescent material to generate either a positive phototaxis response to attract or a negative phototaxis response to repel, a specifically targeted group of the arthropods.

2. The arthropod lure or repellent of claim 1, wherein at least one of the different fluorophore materials further comprises an optical brightening agent (OBA).

3. The arthropod lure or repellent of claim 1, wherein the second wavelength is between 300 nm and 600 nm.

4. The arthropod lure or repellent of claim 1, wherein the spectral bandwidth centered around the second wavelength is between 20 nm and 500 nm.

5. The arthropod lure or repellent of claim 1, wherein the first wavelength is between 100 nm and 400 nm.

6. The arthropod lure or repellent of claim 1, further comprising:
   one or more filters arranged to filter the re-emitted light from the fluorescent material, wherein the one or more filters are one of one or more absorptive optical filters and one or more dichroic optical filters.

7. The arthropod lure or repellent of claim 1, further comprising:
   a clock and/or an ambient sensor; and
   a processor configured to control operation of the ultraviolet light source based on one or more readings from the clock and/or the ambient sensor.

8. The arthropod lure or repellent of claim 1, wherein at least one of the plurality of LEDs comprises a 365 nm excitation light source LED.

9. An arthropod trap, comprising:
   a substrate;
   a fluorescent material attached to the substrate, the fluorescent material comprising different fluorophore materials for generating different spectra emissions simultaneously;
   an ultraviolet light source, wherein the ultraviolet light source comprises a plurality of light emitting diodes (LEDs) to emit different wavelengths of ultraviolet light centered around a first wavelength;
   wherein the different fluorophore materials receiving the different wavelengths of ultraviolet light perform Stokes shift on the received ultraviolet light in which the ultraviolet light of the first wavelength is adsorbed and re-emitted as re-emitted light having different spectra emissions and centered around a second wavelength to produce a combined spectrum made up of an excitation spectrum of the received ultraviolet light and the re-emitted light having the different spectra emissions to generate a positive phototaxis response to specifically attract a targeted group of arthropods, wherein the second wavelength is longer than the first wavelength, wherein the fluorescent material is arranged to re-emit the light at a spectral bandwidth centered around the second wavelength in the range of 10 nm to 600 nm, and wherein the spectral bandwidth of the re-emitted light by the fluorescent material is larger than that of the ultraviolet light emitted from the ultraviolet light source, and wherein the spectral intensity of the re-emitted light by the fluorescent material is lower than that of the ultraviolet light emitted from the ultraviolet light source; and an arthropod immobilizer arranged to immobilize one or more of the arthropods of the targeted group attracted by the fluorescent material.

10. The arthropod trap according to claim 9, wherein at least one of the different fluorophore materials further comprises an optical brightening agent (OBA).

11. The arthropod trap according to claim 9, wherein the second wavelength is between 300 nm and 600 nm.

12. The arthropod trap according to claim 9, wherein the spectral bandwidth centered around the second wavelength is between 20 nm and 500 nm.

13. The arthropod trap according to claim 9, further comprising:
one or more filters to filter the re-emitted light from the fluorescent material, wherein the one or more filters are one of one or more absorptive optical filters and one or more dichroic optical filters.

14. The arthropod trap according to claim 9, further comprising:
a clock and/or an ambient sensor; and
a processor configured to control operation of the ultraviolet light source based on one or more readings from the clock and/or the ambient sensor.

15. The arthropod trap according to claim 9, further comprising:
a housing, wherein the substrate, the arthropod immobilizer and the ultraviolet light source are received in the housing.

16. The arthropod trap according to claim 9, wherein the arthropod immobilizer is an electrocuting grid adjacent the substrate.

17. The arthropod trap according to claim 9, wherein the arthropod immobilizer is an adhesive material applied over at least a portion of the substrate.

18. The arthropod trap according to claim 17, wherein the adhesive material is applied over between 25% and 100% of a surface of the substrate.

19. The arthropod trap according to claim 17, wherein the fluorescent material is disposed within the adhesive material.

20. The arthropod trap according to claim 9, wherein at least one of the plurality of LEDs comprises a 365 nm excitation light source LED.

21. The arthropod trap according to claim 9, wherein each of the different fluorophore materials is a fluorescent chemical compound that contains several combined aromatic groups or planar or cyclic molecules with several π bonds.

22. A lighting device, comprising:
a housing;
an ultraviolet light source received in the housing, the ultraviolet light source comprising a plurality of light emitting diodes (LEDs) to emit different wavelengths of ultraviolet light; and
a fluorescent material on a surface of the housing, the fluorescent material comprising different fluorophore materials for generating different spectra emissions simultaneously, wherein the fluorescent material is arranged to perform Stokes shift on the ultraviolet light in which the ultraviolet light of the first wavelength is absorbed and re-emitted as re-emitted light having different spectra emissions centered around a second wavelength, the second wavelength being longer than the first wavelength, the fluorescent material being arranged to re-emit the light at a first spectral bandwidth centered around the second wavelength in the range of 10 nm to 600 nm, the light emitted by the ultraviolet light source having a second spectral bandwidth around the first wavelength, and the first spectral bandwidth of the light re-emitted by the fluorescent material being larger than the second spectral bandwidth of the light emitted by the ultraviolet light source, and wherein the spectral intensity of the re-emitted light by the fluorescent material is lower than that of the ultraviolet light emitted from the ultraviolet light source; and
wherein the fluorescent material and the ultraviolet light source produce a combined spectrum made up of an excitation spectrum of the light emitted from the ultraviolet light source and the generated different spectra emissions of the light re-emitted by the fluorescent material.

23. The lighting device of claim 22, wherein at least one of the different fluorophore materials comprise an optical brightening agent (OBA).

24. The lighting device of claim 22, wherein the second wavelength is between 300 nm and 600 nm.

25. The lighting device of claim 22, wherein the first spectral bandwidth centered around the second wavelength is between 20 nm and 500 nm.

26. The lighting device of claim 22, wherein the ultraviolet light of the first wavelength emitted by the ultraviolet light source is between 100 nm and 400 nm.

27. The lighting device of claim 22, wherein the second spectral bandwidth of the light emitted by the ultraviolet light source is between 2 nm and 100 nm.

28. The lighting device of claim 22, wherein at least one of the plurality of LEDs comprises a 365 nm excitation light source LED.

* * * * *